United States Patent
Rauffer

[15] 3,679,202
[45] July 25, 1972

[54] DOUBLE SHEET DETECTING AND LOCKING ARRANGEMENT

[72] Inventor: Walter Rauffer, Munich, Germany
[73] Assignee: AGFA-Gevaert A.G., Leverkusen, Germany
[22] Filed: Feb. 18, 1970
[21] Appl. No.: 12,304

[30] Foreign Application Priority Data
March 21, 1969 Germany..................G 69 11 412

[52] U.S. Cl. ............................................271/57
[51] Int. Cl. ............................................B65h 7/06
[58] Field of Search ..............271/57, 56, 47; 226/45

[56] References Cited
UNITED STATES PATENTS

| | | | |
|---|---|---|---|
| 3,371,331 | 2/1968 | Buckholz | 271/57 X |
| 3,354,273 | 11/1967 | Bleiman | 271/57 X |
| 1,701,861 | 2/1929 | Niblack | 271/57 |

*Primary Examiner*—Evon C. Blunk
*Assistant Examiner*—Bruce H. Stoner, Jr.
*Attorney*—Arthur O. Klein

[57] ABSTRACT

An arrangement in a microfilm flow type camera for detecting the presence of a double sheet and for automatically deactivating the transport means for feeding sheets to be photographed on microfilm through the camera when a double sheet has been detected. The arrangement comprises a pair of oppositely arranged feelers between which a sample sheet can be inserted. One feeler of the pair of feelers is operatively connected to one roller of a pair of oppositely arranged rollers between which the sheets to be photographed on microfilm are being passed. One roller of the pair of rollers is operatively connected to a switch in the circuit of the transport mechanism for transporting sheets to be photographed through the camera. The distance between the pair of rollers is slightly larger than the distance between the pair of feelers so that when a double sheet passes between the pair of rollers the switch deactivates the transport mechanism of the camera.

6 Claims, 2 Drawing Figures

PATENTED JUL 25 1972        3,679,202

INVENTOR:
WALTER RAUFFER

BY:
Arthur O. Klein
Attorney

DOUBLE SHEET DETECTING AND LOCKING ARRANGEMENT

BACKGROUND OF THE INVENTION

The present invention relates to an arrangement in a microfilm flow type camera for detecting the presence of a double sheet and the automatic deactivating of the transport means for feeding further sheets through the camera when a double sheet has been detected. A switching arrangement forms part of the camera which scans the thickness of the sheets being passed through the camera, so that, when a certain pre-selected maximum thickness is exceeded, the feeding transport means for the camera are automatically switched off.

Double sheet detecting and locking arrangements for flow type cameras are already known in the art. In these known arrangements the thickness of the sheets being fed through the camera are scanned and the transport means are switched off as soon as a predetermined thickness of an individual sheet passing through the camera has been substantially exceeded. It is, however, necessary in these known arrangements to adjust the permissible maximum thickness of the individual sheets passing through the camera with relatively high precision. This is necessary because of the quality of paper involved. In particular, in microfilm flow-type cameras a wide range of different types of papers are used. For example, such cameras may use papers ranging from the usual carbon copy paper thickness to the index card thickness. Such adjustments of the camera are very time consuming, in particular when the paper quality is frequently changed during the operation of the camera. Furthermore, unskilled persons cannot usually make the necessary precise adjustments.

SUMMARY OF THE INVENTION

It is a general object of the invention to provide an arrangement of the character described in which these drawbacks are avoided. The arrangement of the invention comprises a switch which includes means for detecting the thickness of a sample sheet. For example, the arrangement of the invention comprises two pincer-like feeler members which are disposed opposite with respect to each other, and which scan the thickness of the sheet which is being run-in therebetween. One of the pincer-like feeler members is connected to a switch and the other pincer-like feeler member is connected with the means for detecting the thickness of the sample sheet. In an alternate embodiment of the invention a contact of a switch is connected to means for scanning the thickness of the sheets passing through the microfilm camera and the other contact is connected to means for detecting the thickness of the sample sheet.

In such an arrangement, the scanning means are rendered practically self-adjusting by means of a sample sheet of the material which is to be photographed on microfilm by the camera. This sheet is, for example, before the photographing of the other similar sheets is carried out, placed in a receiving slot provided for this purpose in the camera.

According to a further feature of the invention, the switch can be formed as a microswitch. Furthermore, the feeler members of the scanning means which abut against the sheets passing through the camera can be provided with rollers.

Finally, the distance between the feeler members of the scanning means for the sheets passing through the camera is advantageously larger by a constant value than the distance between the feeler members for detecting the thickness of the sample sheet, so that the double sheet locking arrangement is not activated due to small variations in the paper thickness, such as for example, paper folds, paper creases, etc. cBRIEF DESCRIPTION OF THE DRAWING The invention will be more fully understood from the following description, when read in connection with the accompanying drawing, in which two embodiments of the arrangement of the present invention are diagrammatically illustrated:

FIG. 1 is a schematic elevational illustration of an arrangement in accordance with this invention; and FIG. 2 is a schematic elevational illustration of an alternate arrangement in accordance with this invention.

DESCRIPTION OF PREFERRED EMBODIMENTS

Figure 1:
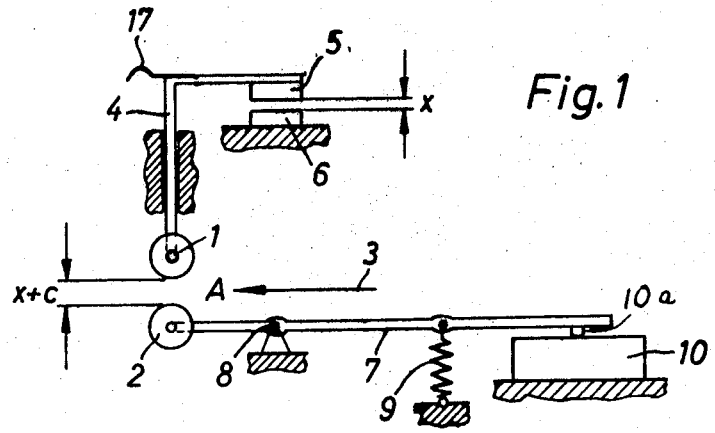

In FIG. 1 there are illustrated two rollers 1 and 2 which form a scanner for scanning the thickness of a sheet 3 passing through the microfilm flow type camera in the direction of the arrow A. The roller 1 is supported by a member 4, slidably mounted in the camera, which is rigidly connected to a feeler 5. This feeler 5 cooperates with a stationary feeler 6 of a sheet thickness detecting arrangement for a sample sheet having the thickness X. The feeler 5 can be manually or mechanically lifted up by means of the handle 17 secured to the feeler 5 so that a sample sheet (not illustrated) can be inserted between the feelers 5 and 6. The feeler 5 due to its force of gravity bears against the sample sheet. The roller 2 is rotatably mounted at one free end of a lever 7 which is pivotally supported on a pivot support 8. A coil spring 9 is connected, at one of its ends, to the frame of the camera and, at its other end, to the lever 7, thereby urging the roller 2 against the roller 1 and, furthermore, urging a contact 10a mounted on the lever 7 against a stationary contact of a microswitch 10 thereby maintaining the microswitch 10 in a closed position. The microswitch 10 thus forms a stationary stop member for the pivotally supported lever 7 and also for the roller 2.

The rollers 1 and 2 are arranged so that, when a sample sheet having a thickness X is inserted between the feelers 5 and 6, there is maintained a thickness X + C between the rollers 1 and 2. The distance X + C corresponds to the thickness of the sample sheet plus an additional predetermined safety distance, which serves as a tolerance distance for small variations in the paper thickness, such as for example, folds or creases in the paper.

When a sheet 3, to be photographed on microfilm, is now passed between the rollers 1 and 2, the microswitch 10 remains closed even when the sheet 3 exhibits certain irregularities such as creases or folds. However, if two sheets are passed simultaneously between the rollers 1 and 2, the distance X + C is definitely exceeded so that the rollers 1 and 2 are pushed apart from each other, the contact 10a is lifted off the stationary contact and the microswitch 10 is opened. The latter is incorporated in the power supply circuit of a driving motor for the sheet transport mechanism of the flow type camera or is mounted in a circuit which is coupled to the drive of the transport mechanism by means of a magnetic coupling arrangement, so that in case a double sheet is passed between the rollers 1 and 2, the transport mechanism is immediately deactivated.

Figure 2:
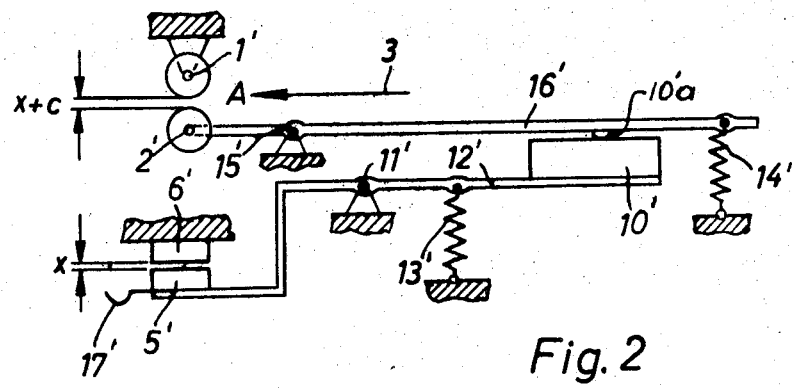

In the alternate arrangement of the invention illustrated in FIG. 2 there are provided a movable feeler 5' and a stationary feeler 6' forming the sheet thickness detecting arrangement for a sample sheet (not illustrated) having the thickness X. The feeler 5' forms an extension of a lever 12' which is pivotally supported on a pivot support 11'.

A coil spring 13' is connected, at one of its ends, to the frame of the camera and, at its other end, to the lever 12' thereby urging the feeler 5' toward the stationary feeler 6'. The feeler 5' can be moved away from the stationary feeler 6' by means of the hand grip 17' secured to the lever 12'. A microswitch 10' is, furthermore, arranged on the lever 12' which bears against a contact 10a' mounted on lever 16' due to the influence of the coil spring 14', which is secured at one of its ends to the frame of the camera and, at its other end, to the lever 16'. As can be noted from FIG. 2, the lever 16' is pivotally supported on a stationary pivot support 15'. The lever 16' rotatably supports at one of its free ends the roller 2' of the scanner 1', 2' which is adapted to scan the thickness of a sheet 3 passing through the microfilm flow type camera in the direction of the arrow A.

In this alternate arrangement of the invention, the sample sheet thickness detecting arrangement 5', 6' adjusts the position of the microswitch 10'. When a sample sheet having a thickness X is disposed between the feelers 5' and 6' then the microswitch 10' is only deenergized when the sheet 3 passing between the rollers 1' and 2' exceeds a distance X + C.

Although my invention has been illustrated and described with reference to the preferred embodiments thereof, I wish to have it understood that it is in no way limited to the details of such embodiments but is capable of numerous modifications within the scope of the appended claims.

What is claimed is:

1. In a microfilm camera having means for transporting sheets therethrough to be photographed on microfilm, an arrangement for detecting the presence of double sheets and for automatically deactivating said transporting means when a double sheet has been detected, comprising in combination, a pair of oppositely disposed feelers operatively mounted in said camera and adapted to sense the thickness of a sample sheet being inserted therebetween, a sample sheet adapted to be disposed between said pair of feelers during operation of the arrangement to automatically maintain said pair of feelers at a predetermined distance from each other, a pair of oppositely disposed members operatively mounted in said camera and adapted to sense the thickness of sheets to be photographed by said camera which pass therebetween, and switching means operatively connected to said pair of members and said transporting means and adapted to deactivate said transporting means when said pair of members sense a double sheet passing therebetween which causes the distance of said pair of members to exceed a distance as determined by said pair of feelers, said pair of feelers operatively coacting with said switching means and said pair of members, at least one feeler of said pair of feelers directly acting on one member of said pair of members.

2. In a microfilm camera having means for transporting sheets to be photographed on microfilm therethrough, an arrangement for detecting the presence of double sheets and for automatically deactivating said transport means when a double sheet has been detected as set forth in claim 1, wherein one member of said pair of members is connected to one feeler of said pair of feelers and the other member of said pair of members is connected to said switching means.

3. In a microfilm camera having means for transporting sheets to be photographed on microfilm therethrough an arrangement for detecting the presence of double sheets and for automatically deactivating said transport means when a double sheet has been detected as set forth in claim 1, wherein said switching means comprises a pair of contacts, one contact of said pair of contacts being connected to one feeler of said pair of feelers and the other contact of said pair of contacts being connected to one member of said pair of members.

4. In a microfilm camera having means for transporting sheets to be photographed on microfilm therethrough, an arrangement for detecting the presence of double sheets and for automatically deactivating said transport means when a double sheet has been detected as set forth in claim 1, wherein said switching means comprise a microswitch.

5. In a microfilm camera having means for transporting sheets to be photographed on microfilm therethrough, an arrangement for detecting the presence of double sheets and for automatically deactivating said transport means when a double sheet has been detected as set forth in claim 1, wherein each member of said pair of members comprises a roller rotatably mounted thereon.

6. In a microfilm camera having means for transporting sheets to be photographed on microfilm therethrough, an arrangement for detecting the presence of double sheets and for automatically deactivating said transport means when a double sheet has been detected as set forth in claim 1, wherein the distance between said pair of members, when said switching means are not deactivating said transporting means, exceeds the distance between said pair of feelers, when a sample sheet has been inserted therebetween, by a predetermined amount.

* * * * *